United States Patent [19]

Kühlthau

[11] 4,294,756
[45] Oct. 13, 1981

[54] CATIONIC DYESTUFFS

[75] Inventor: Hans-Peter Kühlthau, Leverkusen, Fed. Rep. of Germany

[73] Assignee: Bayer Aktiengesellschaft, Leverkusen, Fed. Rep. of Germany

[21] Appl. No.: 65,775

[22] Filed: Aug. 13, 1979

[30] Foreign Application Priority Data

Aug. 31, 1978 [DE]  Fed. Rep. of Germany ....... 2837987

[51] Int. Cl.³ ............................................. C09B 29/22
[52] U.S. Cl. ...................................... 260/163; 260/162
[58] Field of Search ................................ 260/163, 162

[56] References Cited

U.S. PATENT DOCUMENTS

| | | | |
|---|---|---|---|
| 3,092,615 | 6/1963 | Mingasson et al. ............. | 260/162 X |
| 3,173,907 | 3/1965 | Klingsberg et al. ............. | 260/157 |
| 3,515,715 | 6/1970 | Straley et al. .................. | 260/162 X |
| 3,726,852 | 4/1973 | Calla et al. ..................... | 260/162 X |
| 4,101,540 | 7/1978 | Coispeau ........................ | 260/162 X |
| 4,116,954 | 9/1978 | Coispeau et al. ............... | 260/162 |
| 4,122,278 | 10/1978 | Coispeau ........................ | 260/162 X |
| 4,151,162 | 4/1979 | Lang et al. ..................... | 260/162 X |

FOREIGN PATENT DOCUMENTS

| 620990 | 8/1961 | Belgium . |
|---|---|---|
| 1098642 | 2/1961 | Fed. Rep. of Germany . |
| 885046 | 12/1961 | United Kingdom . |

*Primary Examiner*—Paul F. Shaver
*Attorney, Agent, or Firm*—Sprung, Felfe, Horn, Lynch & Kramer

[57] ABSTRACT

Cationic dyestuffs of the formula $$\left[ \begin{array}{c} R_1 \\ | \\ N \\ \diagup \quad \diagdown \\ \quad \quad C-N=N- \\ N \\ | \\ R_2 \end{array} \begin{array}{c} R_3 \\ \diagup \quad \diagdown \\ \diagdown \quad \diagup \\ R_4 \end{array} \begin{array}{c} R_5 \\ \diagdown \; / \\ N \\ / \\ R_6 \end{array} \right]^+ X^- \quad (I)$$

wherein $R_1$ and $R_2$ independently of one another represent a lower alkyl, alkenyl or hydroxyalkyl radical, $R_3$ represents H or halogen, $R_4$ represents H, halogen, or a lower alkyl, alkenyl or alkoxy radical, $R_5$ represents H or a lower alkyl radical, $R_6$ represents a lower alkyl, alkenyl, halogenoalkyl, alkoxyalkyl, hydroxyalkyl or cyanoalkyl radical and $X^-$ represents an anion, at least one of the substituents $R_3$ and $R_4$ being other than H, are used for dyeing and printing natural and synthetic materials, in particular polyacrylonitrile.

10 Claims, No Drawings

CATIONIC DYESTUFFS

The invention relates to new cationic dyestuffs of the general formula

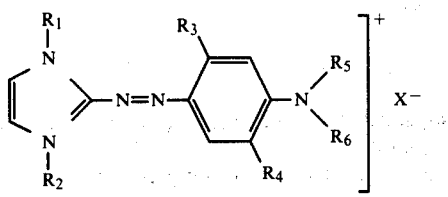

wherein
- $R_1$ and $R_2$ independently of one another represent a lower alkyl, alkenyl or hydroxyalkyl radical,
- $R_3$ represents H or halogen,
- $R_4$ represents H, halogen, or a lower alkyl, alkenyl or alkoxy radical,
- $R_5$ represents H or a lower alkyl radical,
- $R_6$ represents a lower alkyl, alkenyl, halogenoalkyl, alkoxyalkyl, hydroxyalkyl or cyanoalkyl radical and
- $X^-$ represents an anion, at least one of the substituents $R_3$ and $R_4$ being other than H, their preparation and their use for dyeing and printing natural and synthetic materials.

By lower alkyl and alkoxy radicals there are understood, in particular, straight-chain or branched radicals with 1 to 4 C atoms.

Lower alkenyl radicals are, in particular, those with 3 or 4 C atoms, above all the allyl, butenyl and 1-butenyl radical.

Halogen represents, above all, fluorine and chlorine.

The anion $X^-$ can be derived from inorganic and organic acids.

Examples of inorganic anions are fluoride, chloride, bromide and iodide, perchlorate, hydroxyl, radicals of acids containing S, such as bisulphate, sulphate, disulphate and aminosulphate; radicals of nitrogen-oxygen acids, such as nitrate; radicals of oxygen acids of phosphorus, such as dihydrogen phosphate, hydrogen phosphate and metaphosphate; radicals of carbonic acid, such as bicarbonate and carbonate; further anions of oxygen acids and complex acids, such as methosulphate, ethosulphate, hexafluosilicate, cyanate, thiocyanate, trichlorozincate and tetrachlorozincate, borate and tetrafluoborate, as well as anions of esters of boric acid, such as of the glycerol ester of boric acid, and of esters of phosphoric acid, such as of methylphosphate.

Examples of organic anions are anions of saturated or unsaturated aliphatic, cycloaliphatic, aromatic and heterocyclic carboxylic acids and sulphonic acids, such as radicals of formic acid, acetic acid, chloroacetic acid, cyanoacetic acid, hydroxyacetic acid, aminoacetic acid, methylaminoacetic acid, aminoethyl-sulphonic acid, methylaminoethyl-sulphonic acid, propionic acid, n-butyric acid, i-butyric acid, 2-methylbutyric acid, 2-ethylbutyric acid, dichloroacetic acid, trichloroacetic acid, trifluoroacetic acid, 2-chloropropionic acid, 3-chloropropionic acid, 2-chlorobutyric acid, 2-hydroxypropionic acid, 3-hydroxypropionic acid, O-ethylglycollic acid, thioglycollic acid, glyceric acid, malic acid, dodecyl-tetraethylene glycol ether-propionic acid, phenoxyacetic acid, nonylphenoxyacetic acid, n-valeric acid, i-valeric acid, 2,2,2-trimethylacetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9–11 carbon atoms (Versatic Acid 911 from SHELL), acrylic acid, methacrylic acid, crotonic acid, propargylic acid, oxalic acid, malonic acid, succinic acid, glutaric acid, adipic acid, pimelic acid, suberic acid, the isomer mixture of 2,2,4- and 2,4,4-trimethyladipic acid, sebacic acid, isosebacic acid (isomer mixture), tartaric acid, citric acid and glyoxylic acid.

Examples of suitable anions of cycloaliphatic carboxylic acids are the anions of cyclohexanecarboxylic acid and cyclohexene-3-carboxylic acid and examples of anions of araliphatic monocarboxylic acids are anions of phenylacetic acid, 4-methylphenylacetic acid and mandelic acid.

Examples of suitable anions of aromatic carboxylic acids are the anions of substituted and unsubstituted benzoic acid and of phthalic acid, tetrachlorophthalic acid, 4-hydroxyphthalic acid, 4-methoxyphthalic acid, isophthalic acid, 4-chloro-iso-phthalic acid, 5-nitro-isophthalic acid, terephthalic acid, nitroterephthalic acid and diphenyl-3,4-carboxylic acid, o-vanillic acid, 3-sulphobenzoic acid, benzene-1,2,4,5-tetracarboxylic acid, naphthalene-1,4,5,8-tetracarboxylic acid, biphenyl-4-carboxylic acid, abietic acid, phthalic acid mono-n-butyl ester, terephthalic acid mono-methyl ester, 3-hydroxy-5,6,7,8-tetrahydronaphthalene-2-carboxylic acid, 2-hydroxy-1-naphthoic acid and anthraquinone-2-carboxylic acid.

Examples of suitable anions of aromatic sulphonic acids are the anions of benzenesulphonic acid, benzene-1,3-disulphonic acid, 4-chlorobenzenesulphonic acid, 3-nitrobenzenesulphonic acid, 6-chloro-3-nitrobenzenesulphonic acid, toluene-4-sulphonic acid, toluene-2-sulphonic acid, toluene-ω-sulphonic acid, 2-chlorotoluene-4-sulphonic acid, 2-hydroxybenzenesulphonic acid and n-dodecylbenzenesulphonic acid.

Colourless anions are preferred. For dyeing from an aqueous medium, anions which do not excessively impair the solubility of the dyestuff in water are preferred. For dyeing from organic solvents, anions which assist the solubility of the dyestuff in organic solvents or at least do not influence it adversely are frequently also preferred.

The anion is in general decided by the preparation process and by purification of the crude dyestuff which may be carried out. In general, the dyestuffs are in the form of zinc chloride double salts, acetates, methosulphates, ethosulphates or halides (especially as chlorides or bromides). The anions can be replaced by other anions in a known manner.

In preferred dyestuffs of the formula I,
- $R_3$ represents chlorine and
- $R_4$ represents hydrogen or
- $R_5$ represents a lower alkyl radical.

Dyestuffs of the formula I
wherein
- $R_1$ and $R_2$ represents methyl or ethyl,
- $R_3$ represents H or chlorine,
- $R_4$ represents H, fluorine, chlorine, methyl, ethyl, ethoxy or methoxy,
- $R_5$ represents methyl or ethyl, but in particular H,
- $R_6$ represents methyl or ethyl and
- $X^-$ represents an anion, at least one of the substituents $R_3$ and $R_4$ being other than H, are also to be singled out.

Of these dyestuffs, those examples in which $R_3$ represents H and $R_4$ represents methyl, ethyl, ethoxy or methoxy, are particularly interesting.

Of these dyestuffs, the examples in which $R_1$ and $R_2$ represent methyl, $R_4$ represents methyl or methoxy, $R_5$ represents methyl, but in particular H, and $R_6$ represents methyl, are of very particular importance.

The new dyestuffs of the general formula I are obtainable by known processes, such as are described, for example, in German Pat. Nos. 1,098,642, 1,137,815 and 1,137,816.

They are obtained, for example by reacting compounds of the formula

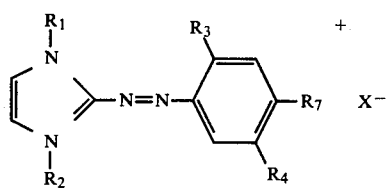 (II)

with amines of the formula

 (III)

In the formulae (II) and (III)

$R_1$, $R_2$, $R_3$, $R_4$, $R_5$, $X^-$ and $R_6$ have the meaning given in the case of formula (I).

$R_7$ denotes a group which can be split off by an amine (III), for example an alkoxy group, an alkylthio group or a halogen atom.

$R_7$ can also denote hydrogen.

In the latter case, the reaction with the amine (III) is carried out in the presence of an oxidising agent, such as, for example, atmospheric oxygen.

The reactions of (II) with (III) can be carried out without a diluent, in aqueous solution or suspension, or in the presence of organic solvents or mixtures thereof with water, at 0°–120° C., preferably at 20°–90° C. Many compounds already react between 0° C. and 20° C. The compounds of the formula (II) are prepared in a known manner by diazotising aminobenzenes of the formula (IV)

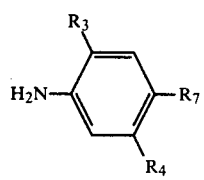 (IV)

wherein $R_3$, $R_4$ and $R_7$ have the meaning given in the case of formula (II), coupling the diazotisation product to imidazole and then reacting the resulting compound (V)

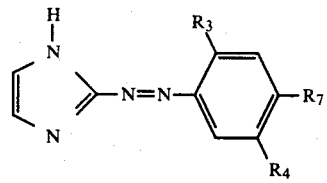 (V)

wherein $R_3$, $R_4$ and $R_7$ have the meaning given in the case of formula II, with compounds having an alkylating action, of the formula

   (VI)

or

   (VIa)

wherein $R_1$ and $R_2$ have the meaning given in the case of formula (I) and

X is a group which supplies an anion $X^-$, or with oxiranes of the formula

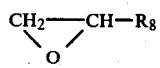 (VII)

wherein $R_8$ represents H, methyl or ethyl.

Examples of suitable diazo components (IV) are: m-toluidine; 2-chloro-5-methylaniline; 2-fluoroaniline; 3-fluoroaniline; 2-chloroaniline; 3-chloroaniline; m-anisidine; 2-chloro-5-methoxyaniline; 3,4-dichloroaniline; 2,5-dichloroaniline; 2,4-dichloroaniline; 3-methyl-4-chloroaniline; 3-methoxy-4-chloroaniline; 3-methyl-4-methoxyaniline; 3,4-dimethoxyaniline; 2-chloro-4-methoxyaniline; 3-chloro-4-methoxyaniline; 3-ethylaniline; 3-methoxy-4-methylmercaptoaniline; 2,4,5-trichloroaniline; 2,4-dichloro-5-methylaniline; 3-ethoxyaniline; 3-propoxyaniline; 3-butoxyaniline and 4-fluoro-3-methylaniline.

Examples of suitable amines (III) are: methylamine; dimethylamine; ethylamine; diethylamine; isopropylamine; n-propylamine; n-butylamine; allylamine; ethanolamine; methylaminoethanol; aminohexanoic acid nitrile and 2-methoxyethylamine.

The new dyestuffs are suitable for dyeing, printing and bulk dyeing materials containing acid groups, above all products which consist completely or predominantly of polymerised unsaturated nitriles, such as acrylonitrile and vinylidene dicyanide, or of acid-modified polyamides or polyesters. They are furthermore suitable for the remaining known applications of cationic dyestuffs, such as dyeing and printing cellulose acetate, coir, jute, sisal and silk, and tannin-treated cotton and paper, for the preparation of ball-point pen pastes and rubber-stamp inks and for use in transfer printing and in flexographic printing. The dyeings and prints on the materials first mentioned, in particular on polyacrylonitrile, are distinguished by a very high level of fastness, above all by very good fastness to light, wet processing, rubbing, decatising, sublimation and perspiration.

The new dyestuffs furthermore have a very good levelling powder which enables uniform dyeings to be achieved on acrylonitrile fibres, even in light shades, without the addition of a retarder and without high requirements with respect to dyeing technology.

The new dyestuffs also have a good affinity and can readily be combined both with other dyestuffs which migrate well and with dyestuffs with a levelling power which is not so good.

EXAMPLE 1 20 g of the dyestuff of the formula

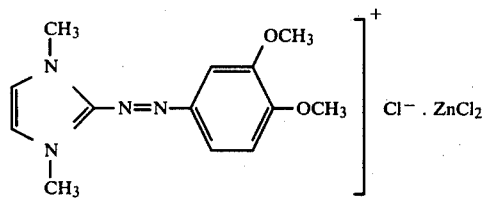

obtained by coupling diazotised 3,4-dimethoxyaniline to imidazole and subsequent methylation with dimethyl sulphate, solution in water and precipitation with sodium chloride and $ZnCl_2$ are stirred with 20 ml of ethanol. 20 g of an aqueous 31% strength methylamine solution are added dropwise to this mixture at 40° C. and the mixture is subsequently stirred at this temperature for a further 2 hours. It is then cooled to room temperature and diluted with 100 ml of saturated sodium chloride solution, and the pH value of the mixture is adjusted to pH 5 with hydrochloric acid. The resulting dyestuff of the formula

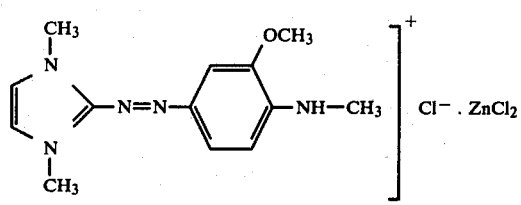

is then filtered off. It dyes polyacrylonitrile and acid-modified polyester in a red colour shade with very good fastness properties and a very good levelling power.

If the reaction is carried out at 20° C. instead of at 40° C., the mixture must be subsequently stirred for 12 hours. If the starting dyestuff is alkylated with diethyl sulphate instead of with dimethyl sulphate, an otherwise identical procedure gives the dyestuff of the formula

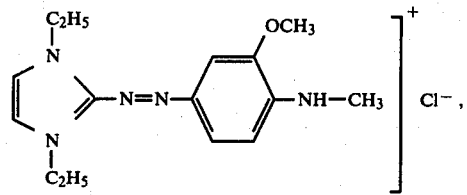

which dyes polyacrylonitrile in a red shade with good fastness properties.

EXAMPLE 2

20 g of the dyestuff of the formula

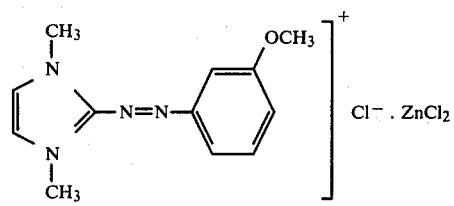

obtained by coupling diazotised m-anisidine to imidazole and subsequent methylation with dimethyl sulphate, solution in water and precipitation with NaCl and $ZnCl_2$, are stirred with 35 ml of a 31.7% strength aqueous methylamine solution at room temperature in the presence of atmospheric oxygen until no further starting dyestuff can be detected in a thin layer chromatogram. The mixture is then diluted with 100 ml of saturated sodium chloride solution and the pH value is adjusted to pH 5 with HCl. The resulting dyestuff is then filtered off. It is identical to the product described in Example 1.

EXAMPLE 3

33 g of concentrated hydrochloric acid are added slowly to 35 g of 31.7% strength methylamine solution. 30 g of the dyestuff of the formula

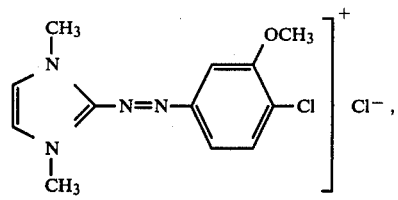

obtained by coupling diazotised 3-methoxy-4-chloroaniline to imidazole and subsequent methylation with dimethyl sulphate, solution in water and precipitation with NaCl, are stirred into this solution, the mixture is heated to 90° C. and a few ml of 31.7% strength methylamine solution are very slowly added dropwise at this temperature, until no further starting dyestuff can be detected in a thin layer chromatogram. The mixture is then cooled to room temperature and diluted with 100 ml of saturated sodium chloride solution and the pH value is adjusted to 5 with HCl. The dyestuff is then filtered off. It is identical to the dyestuff obtained in Example 1.

If one of the amines mentioned in the following table is employed in Examples 1, 2 and 3 instead of methylamine, valuable dyestuffs which dye polyacrylonitrile in the colour shades also listed are likewise obtained:

| Example No. | Amine | Color shade on polyacrylonitrile |
| --- | --- | --- |
| 4 | Dimethylamine | bluish-tinged ruby |
| 5 | Methylaminoethanol | claret |
| 6 | Aminohexanoic acid nitrile | red |
| 7 | Ethylamine | red |
| 8 | Methylaminopropionic acid nitrile | red |
| 9 | Allylamine | red |
| 10 | n-Butylamine | red |
| 11 | n-Propylamine | red |
| 12 | Isobutylamine | red |
| 13 | Aminoethanol | red |
| 14 | Isopropylamine | red |

| Example No. | Amine | Color shade on polyacrylonitrile |
|---|---|---|
| 15 | Diethylamine | bluish-tinged ruby |
| 16 | 2-Methoxyethylamine | red |

EXAMPLE 17

10 g of the dyestuff of the formula

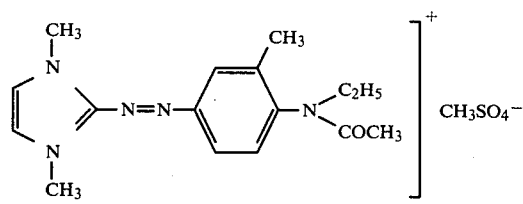

obtained by coupling diazotised 3-methyl-4-(ethylacetylamino)-aniline to imidazole and subsequent methylation with dimethyl sulphate are boiled for 1 hour in 250 ml of water, after adding 20 ml of concentrated hydrochloric acid, with reflux cooling. On cooling, the dyestuff of the formula

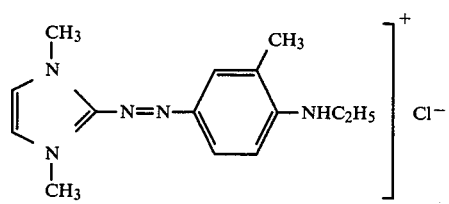

precipitates. It dyes polyacrylonitrile a yellowish-tinged red shade with good fastness properties.

The dyestuffs of the general formula

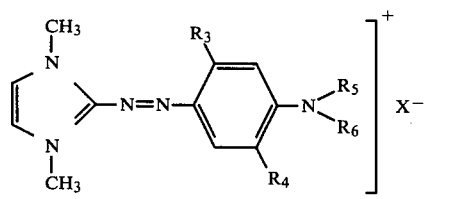

can be prepared by processes analogous to those described in Examples 1, 2 and 3. The following table contains some further examples, indicating the colour shade on polyacrylonitrile.

| Example No. | $R_3$ | $R_4$ | $R_5$ | $R_6$ | Colour shade on polyacrylonitrile |
|---|---|---|---|---|---|
| 18 | H | $CH_3$ | H | $CH_3$ | yellowish-tinged red |
| 19 | " | " | $CH_3$ | " | bluish-tinged red |
| 20 | Cl | H | H | " | yellowish-tinged red |
| 21 | " | " | $CH_3$ | " | red |
| 22 | H | Cl | H | " | reddish-tinged orange |
| 23 | " | " | $CH_3$ | " | bluish-tinged red |
| 24 | " | F | " | " | red |
| 25 | " | " | H | " | orange |
| 26 | " | $CH_3$ | " | $C_2H_5$ | yellowish-tinged red |
| 27 | Cl | H | " | " | yellowish-tinged red |
| 28 | H | Cl | " | " | yellowish-tinged red |
| 29 | " | $OC_2H_5$ | " | $CH_3$ | red |
| 30 | " | " | " | $C_2H_5$ | red |
| 31 | Cl | $CH_3$ | " | $CH_3$ | red |
| 32 | " | $OCH_3$ | " | " | red |

EXAMPLE 33

If the procedure followed is as in Example 2, and instead of the starting material described therein, the dyestuff of the formula

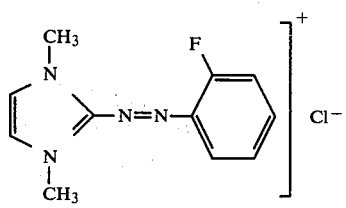

is reacted with methylamine, the expected orange dyestuff

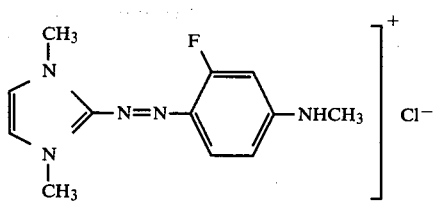

is obtained. A dyestuff of the formula

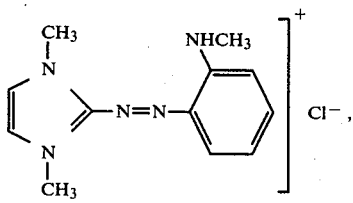

which dyes polyacrylonitrile a ruby colour, is already obtained, as a by-product, at 0° C.

Using dimethylamine, correspondingly gives the ruby dyestuff of the formula

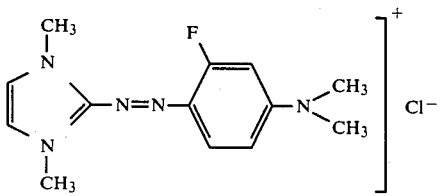

and, already at 0° C., the dyestuff of the formula

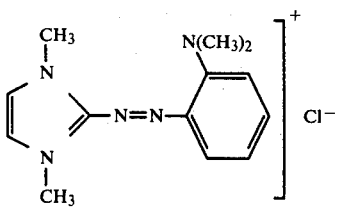

It dyes polyacrylonitrile bluish-tinged violet.

EXAMPLE 34

20 g of the azo dyestuff of the formula

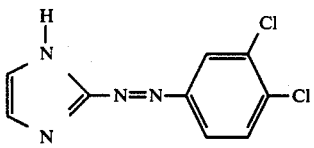

prepared by coupling diazotised 3,4-dichloroaniline to imidazole are stirred in 30 ml of glacial acetic acid. Ethylene oxide is then passed in at 50° C. until the reaction, which can easily be followed by a thin layer chromatogram, is quantitative. The resulting mixture is stirred into 500 ml of saturated sodium chloride solution and clarified with 3 g of active charcoal, and the dyestuff of the formula

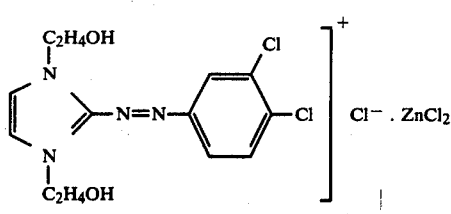

is then precipitated from the filtrate with zinc chloride. It is reacted with dimethylamine by a process analogous to that described in Example 3, to give the dyestuff of the formula

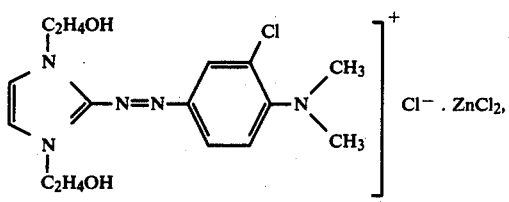

which dyes polyacrylonitrile bluish-tinged red.

If the reaction is carried out with methylamine instead of with dimethylamine, the dyestuff of the formula

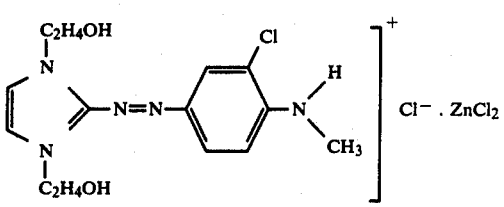

is obtained. It dyes polyacrylonitrile yellowish-tinged red.

I claim:
1. Dyestuffs of the formula

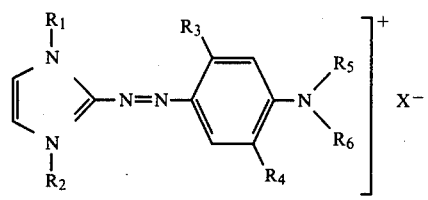

wherein
$R_1$ and $R_2$ independently of one another represent a lower alkyl, alkenyl or hydroxyalkyl radical,
$R_3$ represents H or halogen,
$R_4$ represents H, halogen, or a lower alkyl, alkenyl or alkoxy radical,
$R_5$ represents H or a lower alkyl radical,
$R_6$ represents a lower alkyl, alkenyl, halogenoalkyl, alkoxyalkyl, hydroxyalkyl or cyanoalkyl radical and
$X^-$ represents an anion,
at least one of the substituents $R_3$ and $R_4$ being other than H, and at least one of $R_3$ and $R_5$ being hydrogen.

2. Dyestuffs according to claim 1, wherein
$R_3$ represents chlorine and
$R_4$ represents hydrogen.

3. Dyestuffs according to claim 1, wherein
$R_5$ represents a lower alkyl radical.

4. Dyestuffs according to claim 1, wherein
$R_1$ and $R_2$ represent methyl or ethyl,
$R_3$ represents H or chlorine,
$R_4$ represents H, fluorine, chlorine, methyl, ethyl, ethoxy or methoxy,
$R_5$ represents methyl, ethyl or H, and
$R_6$ represents methyl or ethyl.

5. Dyestuffs according to claim 4, wherein
$R_3$ represents H and
$R_4$ represents methyl, ethyl, ethoxy or methoxy.

6. Dyestuffs according to claim 5, wherein
$R_1$ and $R_2$ represent methyl,
$R_4$ represents methyl or methoxy,
$R_5$ represents methyl or H, and
$R_6$ represents methyl.

7. Dyestuffs according to claim 4, wherein
$R_5$ represents H.

8. Dyestuffs according to claim 6, wherein
$R_5$ represents H.

9. Dyestuff according to claim 1 of the formula

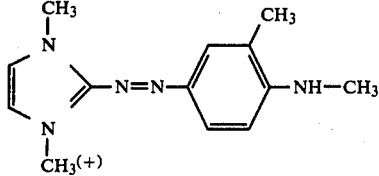

10. Dyestuff according to claim 1 of the formula

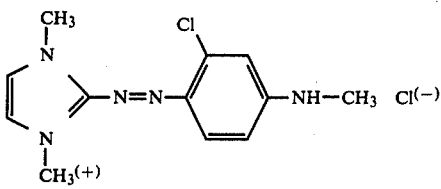

* * * * *

Notice of Adverse Decision in Interference

In Interference No. 101,532, involving Patent No. 4,294,756, H. P. Kuhlthau, CATIONIC DYESTUFFS, final judgment adverse to the patentee was rendered Aug. 4, 1986, as to claims 1-10.

[*Official Gazette September 16, 1986.*]